United States Patent
Wu (10) Patent No.: US 11,070,523 B2
(45) Date of Patent: Jul. 20, 2021

(54) DIGITAL DATA TRANSMISSION SYSTEM, DEVICE AND METHOD WITH AN IDENTITY-MASKING MECHANISM

(71) Applicant: National University of Kaohsiung, Kaohsiung (TW)

(72) Inventor: Chun-Hsin Wu, Kaohsiung (TW)

(73) Assignee: NATIONAL UNIVERSITY OF KAOHSIUNG, Kaohsiung (TW)

(*) Notice: Subject to any disclaimer, the term of this patent is extended or adjusted under 35 U.S.C. 154(b) by 143 days.

(21) Appl. No.: 15/959,351

(22) Filed: Apr. 23, 2018

(65) Prior Publication Data

US 2018/0316648 A1 Nov. 1, 2018

(30) Foreign Application Priority Data

Apr. 26, 2017 (TW) .................... 106113997
Sep. 7, 2017 (TW) .................... 106130684

(51) Int. Cl.
*H04L 29/06* (2006.01)
*H04L 29/12* (2006.01)
*G06F 21/62* (2013.01)

(52) U.S. Cl.
CPC ...... *H04L 63/0414* (2013.01); *H04L 63/0236* (2013.01); *H04L 63/12* (2013.01); *G06F 21/6254* (2013.01); *H04L 61/2521* (2013.01); *H04L 61/2539* (2013.01); *H04L 61/2596* (2013.01); *H04L 61/6022* (2013.01)

(58) Field of Classification Search
CPC . H04L 63/0414; H04L 63/0236; H04L 63/12; H04L 61/2521; H04L 61/2539; H04L 61/2596; H04L 61/6022; G06F 21/6254
See application file for complete search history.

(56) References Cited

U.S. PATENT DOCUMENTS 4,063,226 A 12/1977 Metcalfe et al.
4,868,811 A 9/1989 Suzuki
(Continued)

OTHER PUBLICATIONS

Liver et al "Privacy in Service Oriented Architectures: SOA Boundary Identity Masking for Enterprises," 12th IEEE International Conference on Commerce and Enterprise Computing, 2010, IEEE, pp. 204-211 (Year: 2010).*

*Primary Examiner* — Luu T Pham
*Assistant Examiner* — James J Wilcox
(74) *Attorney, Agent, or Firm* — Che-Yang Chen; Law Office of Michael Chen (57) ABSTRACT

A digital data transmission system includes an identity-masking mechanism, a transmitter device provided with the identity-masking mechanism, and a receiver device having an identification data. The identity-masking mechanism is provided to convert a source or destination data into a source or destination identity-masking mark which is combined with a predetermined data, thereby forming a source-marked or destination-marked data with the source identity-masking mark. The source-marked or destination-marked data is transmitted from the transmitter device to the receiver device for verifying with the identification data. The receiver device cannot access the source-marked or destination-marked data if the verification is failed. The receiver device can access the source-marked or destination-marked data if the verification is passed.

17 Claims, 7 Drawing Sheets

(56) References Cited

U.S. PATENT DOCUMENTS

| | | | | |
|---|---|---|---|---|
| 5,365,551 A * | 11/1994 | Snodgrass | G01S 13/758 375/141 |
| 6,418,480 B1 | 7/2002 | Rijhsinghani | |
| 6,826,684 B1 * | 11/2004 | Fink | H04L 29/12009 713/160 |
| 6,983,366 B1 * | 1/2006 | Huynh | H04L 9/0643 713/168 |
| 7,093,288 B1 * | 8/2006 | Hydrie | H04L 63/0236 709/227 |
| 7,107,335 B1 * | 9/2006 | Arcieri | H04L 29/06 370/392 |
| 9,129,133 B2 * | 9/2015 | LaFever | H04L 63/0414 |
| 9,268,947 B1 * | 2/2016 | Jarlstrom | G06F 21/6218 |
| 9,619,669 B2 * | 4/2017 | LaFever | H04L 63/0414 |
| 10,572,684 B2 * | 2/2020 | LaFever | G06F 21/6254 |
| 2002/0174073 A1 * | 11/2002 | Nordman | G06F 21/316 705/64 |
| 2003/0115345 A1 * | 6/2003 | Chien | H04L 12/2856 709/229 |
| 2003/0169735 A1 * | 9/2003 | Johnson | H04L 12/2801 370/392 |
| 2004/0146052 A1 * | 7/2004 | Chang | H04L 12/4625 370/392 |
| 2005/0091527 A1 * | 4/2005 | Swander | H04L 63/0236 726/4 |
| 2005/0135244 A1 * | 6/2005 | Miller | H04W 12/088 370/229 |
| 2005/0152332 A1 * | 7/2005 | Hannum | H04L 45/00 370/351 |
| 2007/0160200 A1 * | 7/2007 | Ishikawa | H04L 63/0428 380/30 |
| 2008/0046400 A1 * | 2/2008 | Shi | H04L 67/1008 |
| 2009/0022180 A1 * | 1/2009 | Korkishko | H04L 1/0061 370/476 |
| 2009/0135446 A1 | 5/2009 | Kawabuchi et al. | |
| 2009/0327243 A1 * | 12/2009 | Pradhan | G06F 16/93 |
| 2010/0250930 A1 * | 9/2010 | Csaszar | H04L 29/12066 713/168 |
| 2011/0307691 A1 * | 12/2011 | Riguidel | G06F 21/6254 713/150 |
| 2012/0023330 A1 * | 1/2012 | Fink | H04L 63/0428 713/161 |
| 2012/0259877 A1 * | 10/2012 | Raghunathan | G06F 21/6254 707/757 |
| 2014/0019467 A1 * | 1/2014 | Itoh | G06F 21/6227 707/757 |
| 2014/0115715 A1 * | 4/2014 | Pasdar | G06F 21/6254 726/26 |
| 2014/0287723 A1 * | 9/2014 | LaFever | G06Q 30/0201 455/411 |
| 2014/0337447 A1 * | 11/2014 | Payne | G08B 25/085 709/206 |
| 2014/0380052 A1 * | 12/2014 | Tao | H04W 12/069 713/169 |
| 2015/0110127 A1 * | 4/2015 | Lee | H04L 12/2838 370/419 |
| 2015/0128287 A1 * | 5/2015 | LaFever | H04L 63/0407 726/27 |
| 2015/0341307 A1 * | 11/2015 | Page | H04L 45/60 370/392 |
| 2015/0358279 A1 * | 12/2015 | Ellard | H04L 41/00 726/12 |
| 2015/0358285 A1 * | 12/2015 | Ellard | H04L 41/00 726/12 |
| 2015/0379303 A1 * | 12/2015 | LaFever | G06F 21/6254 726/28 |
| 2016/0087933 A1 * | 3/2016 | Johnson | H04W 4/70 709/245 |
| 2016/0092871 A1 * | 3/2016 | Gordon | H04L 63/0414 705/44 |
| 2016/0105399 A1 * | 4/2016 | Rung | H04L 63/0407 726/26 |
| 2016/0283745 A1 * | 9/2016 | LaFever | G06F 21/6254 |
| 2017/0041294 A1 * | 2/2017 | Tulasi | H04L 63/0236 |
| 2017/0091485 A1 * | 3/2017 | Yuen | G06F 21/6254 |
| 2017/0243028 A1 * | 8/2017 | LaFever | G06F 21/6263 |
| 2018/0097776 A1 * | 4/2018 | Van Den Berge | H04L 63/0236 |

* cited by examiner

| Octet 0 | Octet 1 | Octet 2 | Octet 3 | Octet 4 | Octet 5 |
|---|---|---|---|---|---|
| xxxx xxx1 | xxxx xxxx | xxxx xxxx | xxxx xxxx | xxxx xxxx | xxxx xxxx |

| Octet 0 | Octet 1 | Octet 2 | Octet 3 | Octet 4 | Octet 5 |
|---|---|---|---|---|---|
| 00 | C2 | C6 | B7 | 27 | 98 |
| 0000 0000 | 1100 0010 | 1100 0110 | 1011 0111 | 0010 0111 | 1001 1000 |

FIG. 7A

| 01 | D2 | CE | F7 | A7 | 99 |
|---|---|---|---|---|---|
| 0000 0001 | 1101 0010 | 1100 1110 | 1111 0111 | 1010 0111 | 1001 1001 |
| 01 | CA | D6 | BF | 2F | B8 |
| 0000 0001 | 1100 1010 | 1101 0110 | 1011 1111 | 0011 1111 | 1011 1000 |

FIG. 7B

| 01 | 62 | C2 | A7 | 26 | 88 |
|---|---|---|---|---|---|
| 0000 0001 | 0100 0010 | 1100 0010 | 1010 0111 | 0010 0110 | 1000 1000 |
| 01 | C0 | 86 | B6 | 07 | 18 |
| 0000 0001 | 1100 0000 | 1000 0110 | 1011 0110 | 0000 0111 | 0001 1000 |

FIG. 7C

| Octet 0 | Octet 1 | Octet 2 | Octet 3 | Octet 4 | Octet 5 |
|---------|---------|---------|---------|---------|---------|
| 00 | C2 | C6 | B7 | 27 | 98 |
| 0000 0000 | 1100 0010 | 1100 0110 | 1011 0111 | 0010 0111 | 1001 1000 |
| 30 | 85 | A9 | E7 | AE | 48 |
| 0011 000<u>0</u> | 1000 0101 | 1010 1001 | 1110 0111 | 1010 1110 | 0100 1000 |

FIG. 8A

| 01 | 80 | 80 | A7 | 26 | 08 |
|----|----|----|----|----|----|
| 0000 000<u>1</u> | 1000 0000 | 1000 0000 | 1010 0111 | 0010 0110 | 0000 1000 |

FIG. 8B

| 31 | C7 | EF | F7 | AF | D8 |
|----|----|----|----|----|----|
| 0011 000<u>1</u> | 1100 0111 | 1110 1111 | 1111 0111 | 1010 1111 | 1101 1000 |

FIG. 8C

DIGITAL DATA TRANSMISSION SYSTEM, DEVICE AND METHOD WITH AN IDENTITY-MASKING MECHANISM

BACKGROUND OF THE INVENTION

1. Field of the Invention

The present invention relates to a digital data transmission system, device and method with an identity-masking (conversion) mechanism. Particularly, the present invention relates to the digital data transmission system, device and method with a non-uniqueness marking of identity-masking mechanism. More particularly, the present invention relates to the digital data transmission system, device and method with a source-destination-combined mark of identity-masking mechanism.

2. Description of the Related Art

U.S. Pat. No. 4,063,220, entitled "Multipoint Data Communication System with Collision Detection," discloses a multipoint data communication system. The multipoint data communication system includes a plurality of transceivers which includes transmitter sections, receiver sections and a gate. The gate is provided to compare first data from an interface stage with second data on cables.

Another U.S. Pat. No. 4,868,811, entitled "Multiple Access Communication System," discloses a multiple access communication system. The multiple access communication system performs the communication between plural communicating units using plural communicating channels and a common signalling channel for establishing and releasing the communicating channels. The communication system comprises the steps of allocating at least one carrier frequency to the common signalling channel; allocating the carrier frequencies, which are different from the carrier frequency alloted to the common signalling channel, to the communicating channels.

Another U.S. Pat. No. 6,418,480, entitled "Communication Packet Including a Multicast Address and a Destination Address Different than an Equivalent to the Multicast Address," discloses a VLAN communication system. The VLAN communication system includes a multicast address and a destination address. The destination address is different than an equivalent to the multicast Address.

Another U.S. Patent Application Publication No. 20090135446, entitled "Data Communication System Transmitting Data to Prestored Destination Address, Address Management Apparatus, Data Communication Apparatus, Address Management Method, and Address Management Program," discloses a data communication system. The data communication system includes a server and an MFP capable of communicating with each other. The MFP transmits to the server an update requesting signal including a source address of an e-mail received from another apparatus and related information on the source, transmits an address request to the server and receives user address data from the server, and transmits data to at least one destination address included in the received user address data. The server stores the user address data having destination addresses and related information on the destinations associated with each other, and in receipt of the update requesting signal from the MFP, rewrites the related information associated with the source address included in the update requesting signal by the user address data with the related information included in the update requesting signal.

However, there is a need of improving and simplifying a conventional data transmission system for increasing security of data transmission, the difficulty in data cracking and enhancing in data classification. The above-mentioned patents and patent publications are incorporated herein by reference for purposes including, but not limited to, indicating the background of the present invention and illustrating the situation of the art.

As is described in greater detail below, the present invention provides a digital data transmission system, device and method with an identity-masking mechanism. At least one identification data (or source or destination address) is converted into at least one source or destination identity-masking mark which is combined with at least one digital data to form or generate a source-marked or destination-marked data. At least one transmitter device sends the source-marked or destination-marked data to at least one or a group of receiver devices which can verify the source-marked or destination-marked data with a self-identification data (or address) for judging whether or not to receive the source-marked or destination-marked data in such a way as to mitigate and overcome the above problem.

SUMMARY OF THE INVENTION

The primary objective of this invention is to provide a digital data transmission system, device and method with an identity-masking mechanism. At least one identification data (or source or destination address) is converted into at least one source or destination identity-masking mark which is combined with at least one digital data to form or generate a source-marked or destination-marked data. At least one transmitter device sends the source-marked or destination-marked data to at least one or a group of receiver devices which can verify the source-marked or destination-marked data with a self-identification data (or address) for judging whether or not to receive the source-marked or destination-marked data. Advantageously, the digital data transmission system, device and method of the present invention is successful in increasing security of data transmission, the difficulty in data cracking and enhancing in data classification.

The digital data transmission system in accordance with an aspect of the present invention includes:

at least one identity-masking mechanism provided to convert at least one identification data (or source or destination address) into at least one source or destination identity-masking mark which is combined with at least one digital data to form or generate a source-marked or destination-marked data;

at least one transmitter device provided with the identity-masking mechanism to transmit the source-marked or destination-marked data; and at least one receiver device provided with a self-identification data (or address), with the at least one receiver device communicating with the at least one transmitter device;

wherein the at least one receiver device is applied to verify the source-marked or destination-marked data with the self-identification data (or address), with refusing to access the source-marked or destination-marked data if the source-marked or destination-marked data is not successfully verified with the self-identification data (or address); or with receiving or accessing the source-marked or destination-marked data if the source-marked or destination-marked data is successfully verified with the self-identification data (or address).

The digital data transmission method in accordance with an aspect of the present invention includes:

utilizing at least one identity-masking mechanism to convert at least one identification data (or source or destination address) into at least one source or destination identity-masking mark which is combined with at least one digital data to form or generate a source-marked or destination-marked data;

providing at least one transmitter device provided to transmit the source-marked or destination-marked data, with the at least one transmitter device including an identity-masking mechanism;

providing at least one receiver device or at least one group of receiver devices with a self-identification data (or address), with communicating the at least one receiver device or the at least one group of receiver devices with the at least one transmitter device and verifying the source-marked or destination-marked data with the self-identification data (or address); and the at least one receiver device or the at least one group of receiver devices refusing to access the source-marked or destination-marked data if the source-marked or destination-marked data is not successfully verified with the self-identification data (or address); or the at least one receiver device or the at least one group of receiver devices receiving or accessing the source-marked or destination-marked data if the source-marked or destination-marked data is successfully verified with the self-identification data (or address).

The digital data transmission system in accordance with an aspect of the present invention includes:

at least one identity-masking mechanism to convert at least one identification data (or source or destination address) into at least one source or destination identity-masking mark which is combined with at least one digital data to form or generate a source-marked or destination-marked data;

at least one transmitter device provided with the identity-masking mechanism to transmit the source-marked or destination-marked data; and at least one smart card receiver (or smart card receiver/transmitter) provided with a self-identification data (or address), with the at least one smart card receiver communicating with the at least one transmitter device;

wherein the at least one smart card receiver is applied to verify the source-marked or destination-marked data with the self-identification data (or address), with refusing to access the source-marked or destination-marked data if the source-marked or destination-marked data is not successfully verified with the self-identification data (or address); or with receiving or accessing the source-marked or destination-marked data if the source-marked or destination-marked data is successfully verified with the self-identification data (or address).

In a separate aspect of the present invention, the identity-masking mechanism includes a pre-address screening mechanism (or step) or a pre-address transforming mechanism (or step).

In a further separate aspect of the present invention, the identity-masking mechanism includes an address obfuscation mechanism or an address fusion mechanism.

In yet a further separate aspect of the present invention, the address obfuscation mechanism includes a set-obfuscation mechanism or a clear-obfuscation mechanism; or the address fusion mechanism includes an AND-fusion mechanism or an OR-fusion mechanism.

In yet a further separate aspect of the present invention, the at least one receiver device or the group of receiver devices includes an address filtering mechanism.

In yet a further separate aspect of the present invention, the source or destination identity-masking mark includes at least one source or destination address, at least one source or destination network card address, at least one source or destination MAC address, at least one source or destination IP address, at least one mark data or combinations thereof.

In yet a further separate aspect of the present invention, the source or destination identity-masking mark has a fixed-length mark or an unfixed-length mark.

In yet a further separate aspect of the present invention, the self-identification data is at least one digital data or other identification data.

In yet a further separate aspect of the present invention, the source-marked or destination-marked data includes at least one data frame, at least one packet data or other digital data.

In yet a further separate aspect of the present invention, the transmitter device utilizes a hash function to generate the self-identification data.

In a further separate aspect of the present invention, a plurality of the different source or destination identity-masking marks or the different source-marked or destination-marked data are transmitted and received between the same transmitter device and the same receiver device.

In yet a further separate aspect of the present invention, a plurality of the different source or destination identity-masking marks or the different source-marked or destination-marked data are transmitted and received between a plurality of the transmitter devices and a plurality of the receiver devices.

In yet a further separate aspect of the present invention, after receiving the source-marked or destination-marked data, the at least one receiver device or the at least one group of receiver devices further utilize the at least one source or destination identity-masking mark to combine with a digital query data to form or generate a digital reply data and to transmit the digital reply data to the transmitter device.

In yet a further separate aspect of the present invention, the transmitter device further utilizes the at least one source or destination identity-masking mark to combine with the source-marked or destination-marked data to form or generate a multiple marked data which is further transmitted to the at least one receiver device or the at least one group of receiver devices which utilize the self-identification data to verify the multiple marked data.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a digital data transmission (or source-mark digital data transmission) system, device and method with an identity-masking mechanism in accordance with the present invention is suitable for various digital data transmission systems, devices and methods, for example, including various local area networks (e.g. Ethernet/WiFi LAN), various mobile communication networks (e.g. LTE mobile communication network), various short-distance communication (e.g. Bluetooth or Zigbee), various IP networks or other data transmission networks, which are not limitative of the present invention.

Figure 1:
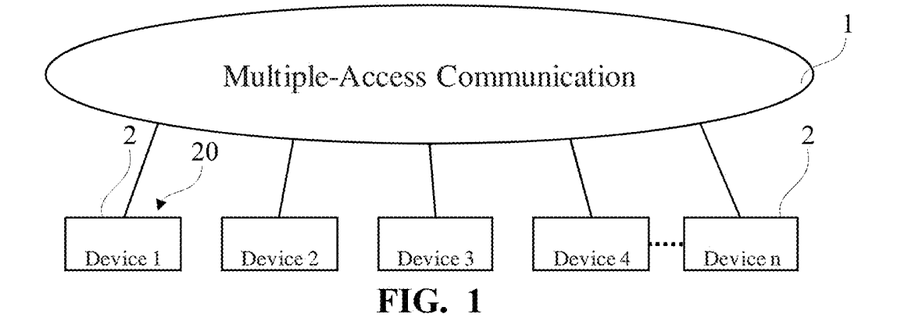
FIG. 1 is a schematic block diagram of a digital data transmission system in accordance with a preferred embodiment of the present invention.

FIG. 1 shows a schematic block diagram of a digital data transmission system in accordance with a preferred embodiment of the present invention. Referring now to FIG. 1, the digital data transmission system can be applied in a multiple-access communication network 1 or other networks. The multiple-access communication network 1 communicates with a plurality of communication devices 2 among which to communicate with a source-destination-combined identity-masking mark. In another embodiment, the communication devices 2 can be selectively communicated with a source identity-masking mark or a destination identity-masking mark. By way of example, the source or destination identity-masking mark or the source-destination-combined identity-masking mark includes at least one identification (ID) data, at least one address data or other digital data with identification function.

Figure 1A:
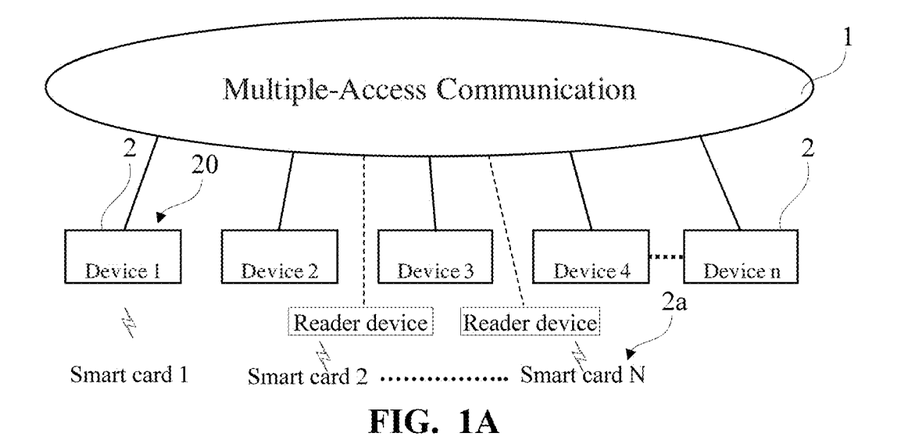
FIG. 1A is a schematic block diagram of a digital data transmission system in accordance with another preferred embodiment of the present invention.

FIG. 1A shows a schematic block diagram of a digital data transmission system in accordance with another preferred embodiment of the present invention, corresponding to the digital data transmission system, as shown in FIG. 1. Referring to FIG. 1A, the digital data transmission system includes a plurality of smart cards 2a. The digital data transmission system can further enable the communication devices 2 to communicate with the smart cards 2a (or smart card receiver/transmitter) via a plurality of suitable communication devices or reader devices in the multiple-access communication network 1.

Figure 2:
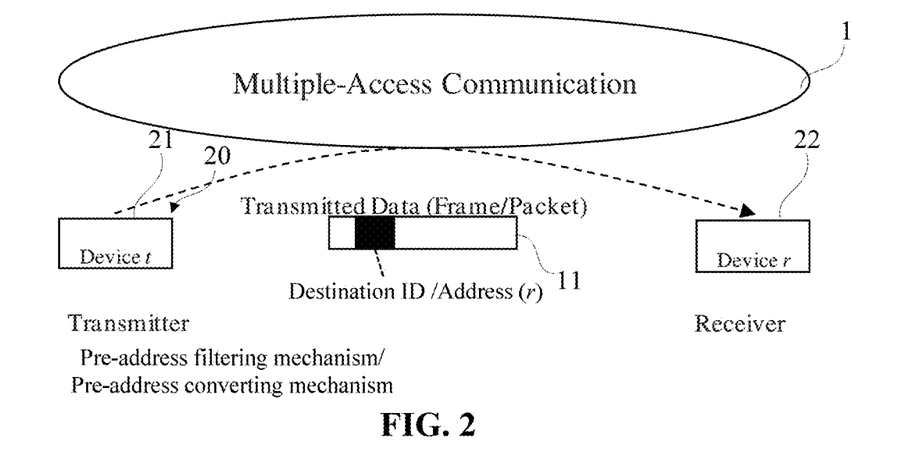
FIG. 2 is a schematic block diagram of data transmission among communication devices applied in the digital data transmission system in accordance with a preferred embodiment of the present invention.

FIG. 2 shows a schematic block diagram of data transmission among communication devices applied in the digital data transmission system in accordance with a preferred embodiment of the present invention. Turning now to FIGS. 1 and 2, the digital data transmission system includes an identity-masking (conversion) mechanism 20, a plurality of transmitter devices 21 and a plurality of receiver devices 22. By way of example, the transmitter devices 21 and the receiver devices 22 are selected from a plurality of communication devices 2 or other devices with a communication function.

With continued reference to FIGS. 1 and 2, the transmitter device 21 can apply the identity-masking mechanism 20 to convert at least one source identification data or at least one destination identification data into at least one source or destination identity-masking mark with at least one or several hash functions. The source or destination identity-masking mark is further combined with at least one digital data to form or generate a marked data 11 which is transmitted to the receiver devices 22 and other communication devices 2 (e.g. smart card receiver/transmitter). By way of example, the marked data 11 can selectively be a source-marked data, a destination-marked data or a source-destination-combined marked data.

With continued reference to FIGS. 1 and 2, by way of example, the identity-masking mechanism 20 includes an address obfuscation mechanism or an address fusion mechanism, with the address obfuscation mechanism including a set-obfuscation mechanism or a clear-obfuscation mechanism, or with the address fusion mechanism including an AND-fusion mechanism or an OR-fusion mechanism.

With continued reference to FIGS. 1 and 2, by way of example, the transmitter device 21 selectively applies the identity-masking mechanism 20 for an identity-masking conversion operation. In a preferred embodiment, the identity-masking mechanism 20 includes a pre-address screening mechanism (or step) or a pre-address transforming mechanism (or step).

With continued reference to FIGS. 1 and 2, by way of example, a data-receiving portion of the receiver device 22 or the group of receiver devices 22 includes an address filtering mechanism (or step) or an equivalent mechanism to avoid improperly receiving the marked data 11 with an unmatched designation. In a preferred embodiment, the receiver device 22 can be selectively provided with a 1-filter or a 0-filter. In yet a preferred embodiment, the receiver device 22 can selectively identify the marked data 11 with bit positions or numerals of data frame or packet.

Figure 2A:
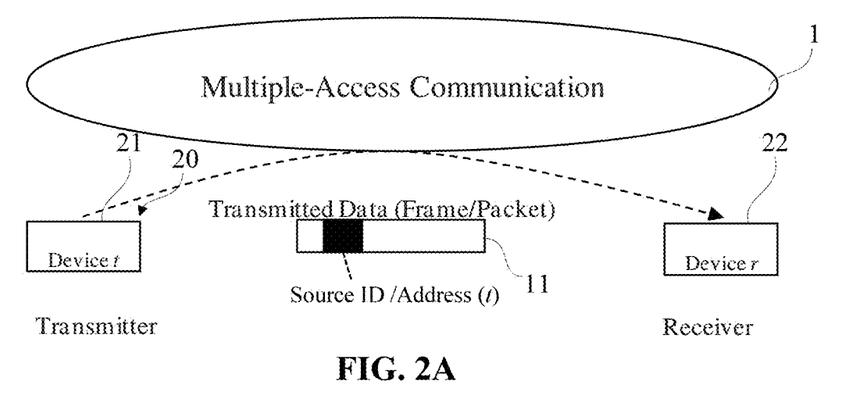
FIG. 2A is a schematic block diagram of data transmission among communication devices applied in the digital data transmission system in accordance with another preferred embodiment of the present invention.

FIG. 2A shows a schematic block diagram of data transmission among communication devices applied in the digital data transmission system in accordance with another preferred embodiment of the present invention, corresponding to the digital data transmission system in FIG. 2. Referring now to FIG. 2A, the marked data 11 is formed from a source-marked data of source ID or address transmitted in the multiple-access communication network 1.

Figure 2B:
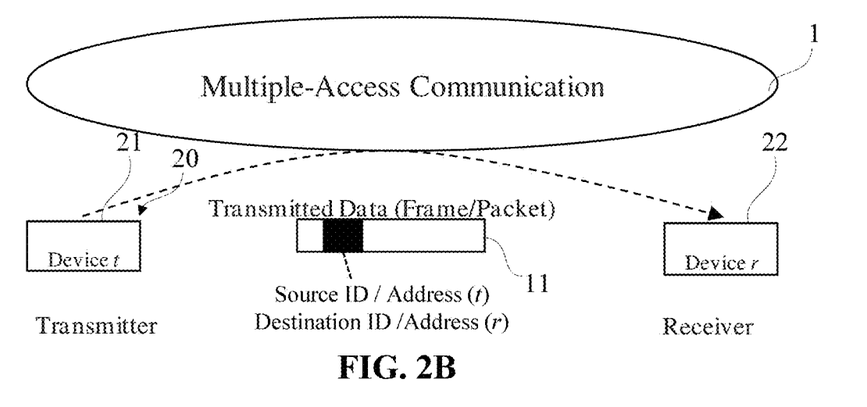
FIG. 2B is a schematic block diagram of data transmission among communication devices applied in the digital data transmission system in accordance with another preferred embodiment of the present invention.

FIG. 2B shows a schematic block diagram of data transmission among communication devices applied in the digital data transmission system in accordance with another preferred embodiment of the present invention, corresponding to the digital data transmission system in FIGS. 2 and 2A. Referring now to FIG. 2B, the marked data 11 is formed from a source-destination-combined marked data of source ID or address and destination ID or address transmitted in the multiple-access communication network 1.

Figure 2C:
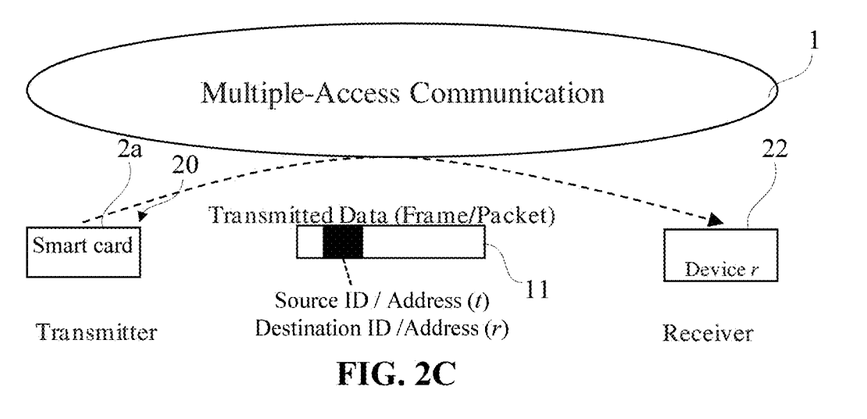
FIG. 2C is a schematic block diagram of data transmission among communication devices applied in the digital data transmission system in accordance with another preferred embodiment of the present invention.

FIG. 2C shows a schematic block diagram of data transmission among communication devices applied in the digital data transmission system in accordance with another preferred embodiment of the present invention, corresponding to the digital data transmission system in FIGS. 2, 2A and 2B. Referring now to FIG. 2C, the smart cards 2a communicates with the receiver device 22 in the multiple-access communication network 1.

Figure 3A:
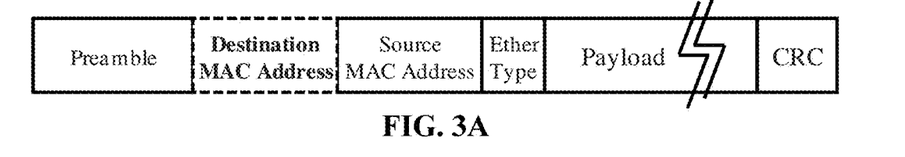
FIG. 3A is a schematic diagram of a format of data frame applied in the digital data transmission system in accordance with the preferred embodiment of the present invention.
Figure 3B:
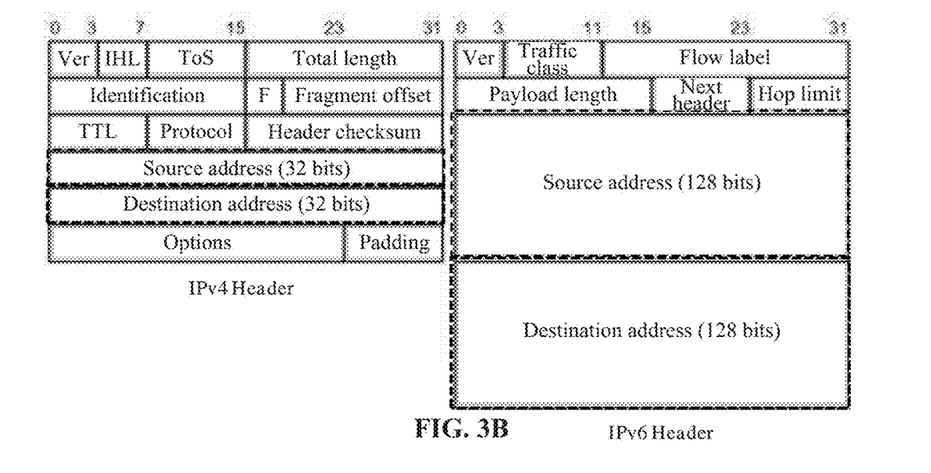
FIG. 3B is a schematic diagram of data packets applied in the digital data transmission system in accordance with the preferred embodiment of the present invention.

FIG. 3A shows a schematic diagram of a format of data frame (e.g. signal frame of Ethernet LAN) applied in the digital data transmission system in accordance with the preferred embodiment of the present invention; FIG. 3B shows a schematic diagram of two data packets (e.g. IPv4/IPv6 packet) applied in the digital data transmission system in accordance with the preferred embodiment of the present invention. Referring to FIGS. 1, 2, 3A and 3B, by way of example, the marked data 11 can be at least one signal frame (as best shown in FIG. 3A), at least one packet (as best shown in FIG. 3B) or other digital data.

Figure 3C:
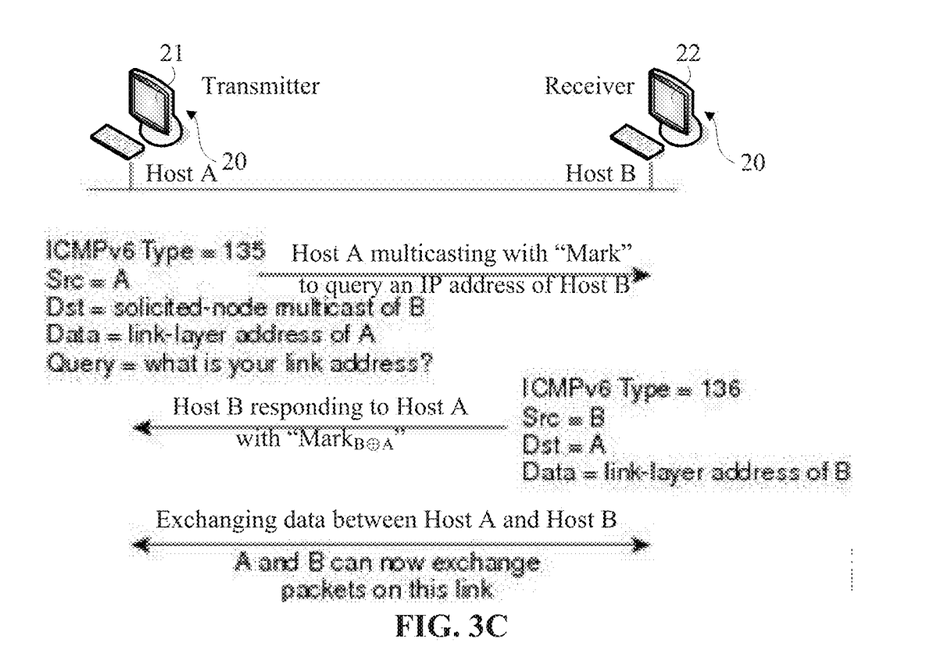
FIG. 3C is a schematic diagram of query and response between a transmitter device and a receiver device applied in the digital data transmission system in accordance with the preferred embodiment of the present invention.

FIG. 3C shows a schematic diagram of query and response between a transmitter device and a receiver device applied in the digital data transmission system in accordance with the preferred embodiment of the present invention. Referring now to FIG. 3C, by way of example, the transmitter device 21 (Host A, $IP_A$) or another transmitter device (Host C) can cast or multicast to query a network card address ($MAC_B$) of the receiver device 22 (Host B, $IP_B$), as best shown at rightward arrow in FIG. 3C. Furthermore, the receiver device 22 obfuscates the network card address ($MAC_B$) as "$Mark_B$" so as to form non-uniqueness and to accomplish identification masking. When the receiver device 22 replies the transmitter device 21 (Host A, $IP_A$) or another transmitter device (Host C), the receiver device 22 adds "A" or "C" to "$Mark_B$" to form "$Mark_{B \oplus A}$" or "$Mark_{B \ominus C}$" which are transmitted to the transmitter device 21 (Host A) or another transmitter device (Host C), as best shown at leftward arrow in FIG. 3C.

Figure 4:
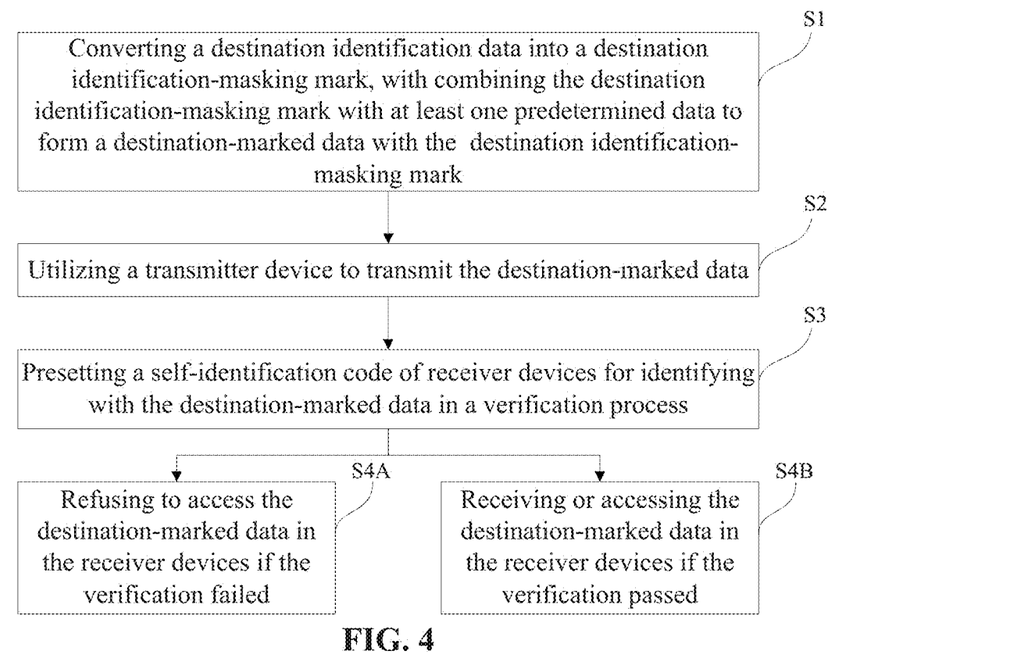
FIG. 4 is a flow chart of a digital data transmission method with an identity-masking mechanism in accordance with a first preferred embodiment of the present invention.

FIG. 4 shows a flow chart of a digital data transmission method with an identity-masking mechanism in accordance with a first preferred embodiment of the present invention. Referring now to FIGS. 1, 2 and 4, the digital data transmission method in accordance with the first preferred embodiment of the present invention includes the step S1: utilizing at least one identity-masking mechanism to convert at least one identification data into at least one destination identity-masking mark which is combined with at least one digital data to form or generate a destination-marked data, as best shown at label "2" in FIG. 2.

In a preferred embodiment, the identity-masking mark includes at least one source or destination address, at least one source or destination network card address, at least one source or destination MAC address, at least one source or destination IP address, at least one ID or combinations thereof.

In a preferred embodiment, the self-identification data is at least one digital data or other identification data. The source identity-masking mark or the destination identity-masking mark has a characteristic of uniqueness or non-uniqueness. The source identity-masking mark or the destination identity-masking mark also has a characteristic of multiplicity.

In a preferred embodiment, the source identity-masking mark, the destination identity-masking mark, the source-destination-combined identity-masking mark or other multiple identity-masking mark has a fixed-length mark or an unfixed-length mark.

With continued reference to FIGS. 1, 2 and 4, the digital data transmission method in accordance with the first preferred embodiment of the present invention further includes the step S2: providing at least one transmitter device 21 or at least one group of transmitter devices 21 (or smart card receiver/transmitter) to transmit the destination-marked data, with the at least one transmitter device 21 or at least one group of transmitter devices 21 including the identity-masking mechanism 20.

With continued reference to FIGS. 1, 2 and 4, the digital data transmission method in accordance with the first preferred embodiment of the present invention further includes the step S3: providing at least one receiver device 22 or at least one group of receiver devices 22 with a self-identification data, with communicating the at least one receiver device 22 or the at least one group of receiver devices 22 with the transmitter devices 21 and verifying the destination-marked data with the self-identification data.

With continued reference to FIGS. 1, 2 and 4, the digital data transmission method in accordance with the first preferred embodiment of the present invention further includes the step S4A: the at least one receiver device 22 or the at least one group of receiver devices 22 refusing to access the destination-marked data or ignoring the destination-marked data if the destination-marked data is not successfully verified with the self-identification data.

With continued reference to FIGS. 1, 2 and 4, the digital data transmission method in accordance with the first preferred embodiment of the present invention further includes the step S4B: the at least one receiver device 22 or the at least one group of receiver devices 22 receiving or accessing the destination-marked data if the destination-marked data is successfully verified with the self-identification data.

Figure 4A:
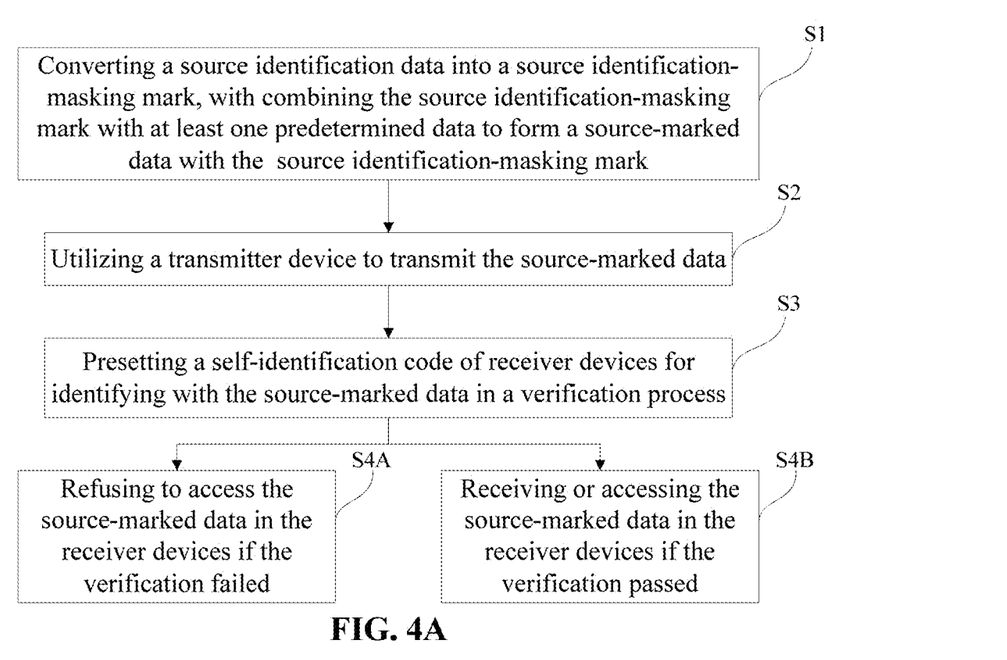
FIG. 4A is a flow chart of a digital data transmission method with an identity-masking mechanism in accordance with a second preferred embodiment of the present invention.

FIG. 4A shows a flow chart of a digital data transmission method with an identity-masking mechanism in accordance with a second preferred embodiment of the present invention. Referring now to FIGS. 1, 2 and 4A, the digital data transmission method in accordance with the second preferred embodiment of the present invention includes the step S1: utilizing at least one identity-masking mechanism to convert at least one identification data into at least one source identity-masking mark which is combined with at least one digital data to form or generate a source-marked data, as best shown at label "2" in FIG. 2.

With continued reference to FIGS. 1, 2 and 4A, the digital data transmission method in accordance with the second preferred embodiment of the present invention further includes the step S2: providing at least one transmitter device 21 or at least one group of transmitter devices 21 (or smart card receiver/transmitter) to transmit the source-marked data, with the at least one transmitter device 21 or at least one group of transmitter devices 21 including the identity-masking mechanism 20. In a preferred embodiment, the transmitter device 21 can apply a unicast (one-to-one) data-transmission module, a multicast (one-to-multiple) data-transmission module or a multiple-to-multiple data-transmission module.

With continued reference to FIGS. 1, 2 and 4A, the digital data transmission method in accordance with the second preferred embodiment of the present invention further includes the step S3: providing at least one receiver device 22 or at least one group of receiver devices 22 with a self-identification data, with communicating the at least one receiver device 22 or the group of receiver devices 22 with the transmitter devices 21 and verifying the source-marked data with the self-identification data.

With continued reference to FIGS. 1, 2 and 4A, the digital data transmission method in accordance with the second preferred embodiment of the present invention further includes the step S4A: the at least one receiver device 22 or the at least one group of receiver devices 22 refusing to access the source-marked data or ignoring the source-marked data if the source-marked data is not successfully verified with the self-identification data.

With continued reference to FIGS. 1, 2 and 4A, the digital data transmission method in accordance with the second preferred embodiment of the present invention further includes the step S4B: the at least one receiver device 22 or the at least one group of receiver devices 22 receiving or accessing the source-marked data if the source-marked data is successfully verified with the self-identification data.

Figure 5:
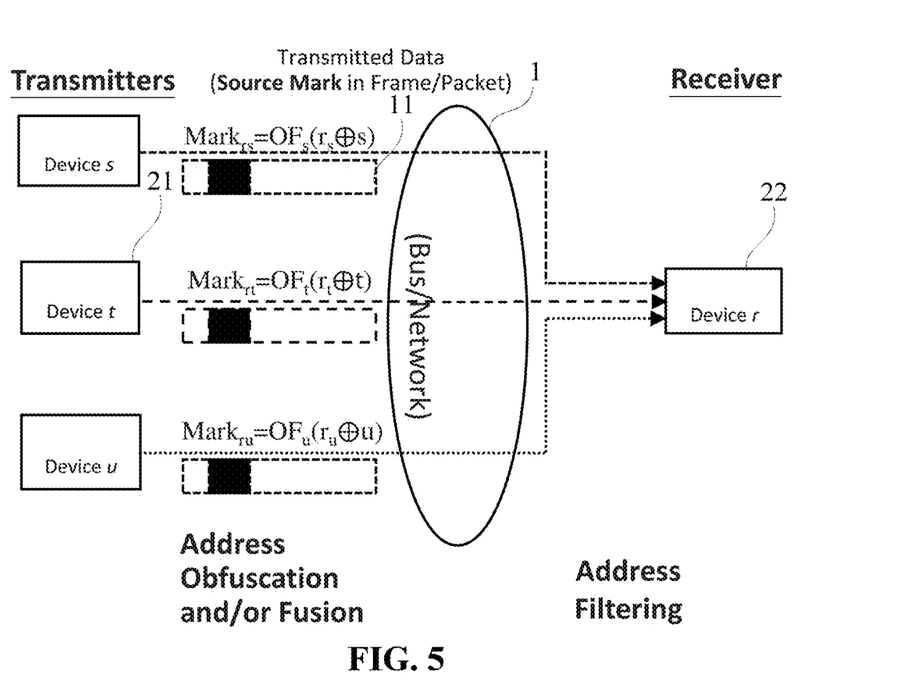
FIG. 5 is a schematic block diagram of a source mark type of transmission data applied in the digital data transmission system with the identity-masking mechanism in accordance with a preferred embodiment of the present invention.

FIG. 5 shows a schematic block diagram of a source mark type of transmission data applied in the digital data transmission system with the identity-masking mechanism in accordance with a preferred embodiment of the present invention. Referring now to FIG. 5, a plurality of the transmitter devices 21 (Device s, Device t, Device u) transmit different data frame (or packet) to the receiver 22 (Device r). The obfuscation and the fusion of the transmitter devices 21 (Device s, Device t, Device u) or the receiver 22 (Device r) can generate a source identity-masking mark which has a characteristic of non-uniqueness and can be changed on an irregular schedule to achieve identification masking. By way of example, the transmitter devices 21 (Device s) selectively generate a destination MAC identity-masking mark as "$Mark_{rs}$" which can be received by the receiver 22 (Device r). In another preferred embodiment, a source MAC identity-masking mark is selectively converted into "Mark" by obfuscation and fusion to mask its own network card address.

Figure 5A:
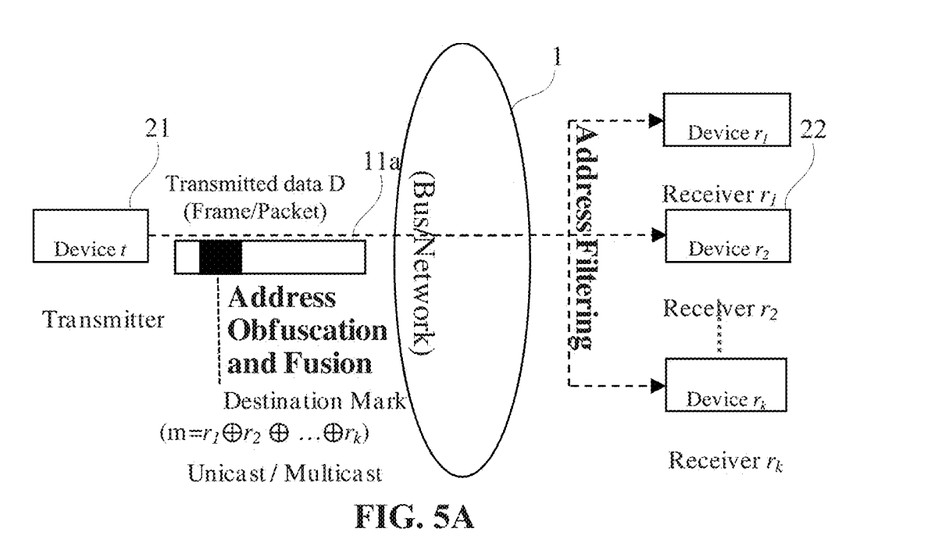
FIG. 5A is a schematic block diagram of another destination mark type of transmission data applied in the digital data transmission system with the identity-masking mechanism in accordance with another preferred embodiment of the present invention.

FIG. 5A shows a schematic block diagram of another destination mark type of transmission data applied in the digital data transmission system with the identity-masking mechanism in accordance with another preferred embodiment of the present invention. Referring now to FIG. 5A, a plurality of the different source or destination identity-masking marks or the different source-marked or destination-marked data are transmitted and received between the same transmitter device 21 and the same receiver device 22. The transmitter device 21 converts at least one or a plurality of identification data or addresses into at least one destination identity-masking mark by the identity-masking mechanism, and further combines the destination identity-masking mark with a digital data to form or generate a destination-marked data 11a which is transmitted to at least one or a plurality of the receiver devices 22 (Device r1, Device r2, . . . Device rk).

Referring again to FIGS. 5 and 5A, in a preferred embodiment, the digital data transmission system utilizes the source identity-masking mark and the destination identity-masking mark to combine with a digital data (e.g. data frame or packet) to form or generate a multiple marked data which can be verified by the self-identification data of the transmitter device 21 and the receiver device 22.

Figure 6:
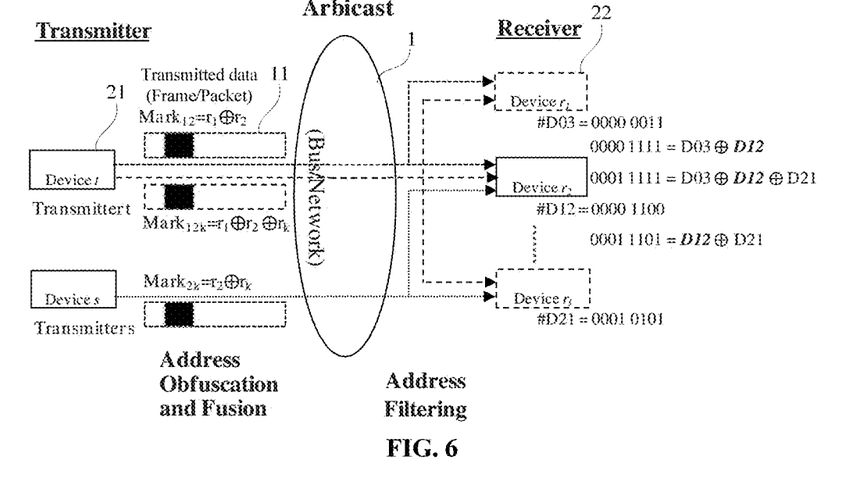
FIG. 6 is a schematic block diagram of another destination mark type of transmission data applied in the digital data transmission system with the identity-masking mechanism in accordance with another preferred embodiment of the present invention.

FIG. 6 shows a schematic block diagram of another destination mark type of transmission data applied in the digital data transmission system with the identity-masking mechanism in accordance with another preferred embodiment of the present invention. Referring now to FIG. 6, a plurality of the different source or destination identity-masking marks or the different source-marked or destination-marked data are transmitted and received between a plurality of the transmitter devices 21 and a plurality of the receiver devices 22. The source or destination identity-masking marks are non-uniqueness so that the same transmitter device 21 can transmit different identity-masking marks to the same receiver device 22. According to different needs, the same transmitter device 21 can transmit various types of data transmission, including one-to-one (unicast) data transmission, one-to-multiple (multicast) data transmission or multiple-to-multiple data transmission.

With continued reference to FIG. 6, the transmitter device 21 (Device t) is selected to transmit different data frames or packets "$Mark_{12}$" and "$Mark_{12k}$", or the transmitter device 21 (Device s) is selected to transmit a data frame or a packet "$Mark_{2k}$", and the receiver device 22 (Device r2) is selected to verify and receive the data frames or packets "$Mark_{12}$", "$Mark_{12k}$" and "$Mark_{2k}$".

With continued reference to FIG. 6, in another preferred embodiment, the receiver device 22 (Device r1) is designated to refuse to receive the data frame or packet "Mark$_{2k}$" and the receiver device 22 (Device rk) is designated to refuse to receive the data frame or packet "Mark$_{12}$". In another preferred embodiment, the receiver device 22 (Device r1) is designated to refuse to receive the data frame or packet "Mark$_{2k}$" but can receive the data frames or packets "Mark$_{12}$", "Mark$_{12k}$" or both. In another preferred embodiment, the receiver device 22 (Device rk) is designated to refuse to receive the data frame or packet "Mark$_{12}$" but can receive the data frames or packets "Mark$_{2k}$", "Mark$_{12k}$" or both.

Referring back to FIGS. 5A and 6, in another preferred embodiment, the digital data transmission system utilizes the source identity-masking mark and the destination identity-masking mark to combine with a digital data (e.g. data frame or packet) to form or generate a multiple marked data which can be verified by the self-identification data of the transmitter device 21 and the receiver device 22.

Figure 7A:
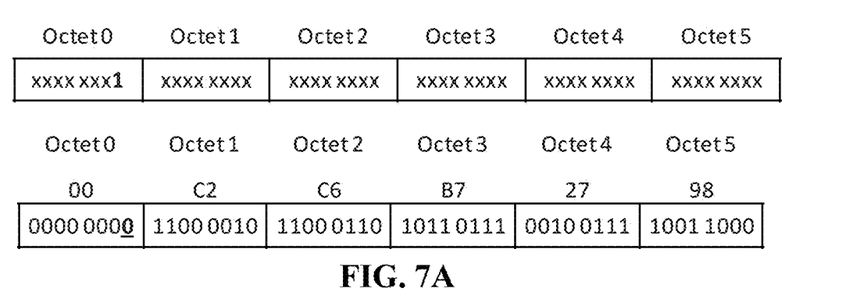
FIG. 7A is a schematic diagram of a first original Ethernet network card address applied in the digital data transmission system with the identity-masking mechanism in accordance with a preferred embodiment of the present invention.

FIG. 7A shows a schematic diagram of a first original Ethernet network card address applied in the digital data transmission system with the identity-masking mechanism in accordance with a preferred embodiment of the present invention. Referring now to FIG. 7A, the first original Ethernet network card address is 00-C2-C6-B7-27-98 remained in the digital data transmission system.

Figure 7B:
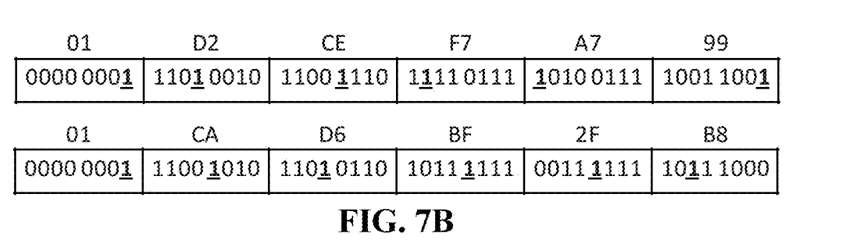
FIG. 7B is a schematic diagram of setting multicast bits and set-obfuscation of bit addresses applied in the digital data transmission system with the identity-masking mechanism in accordance with a preferred embodiment of the present invention.
Figure 7C:
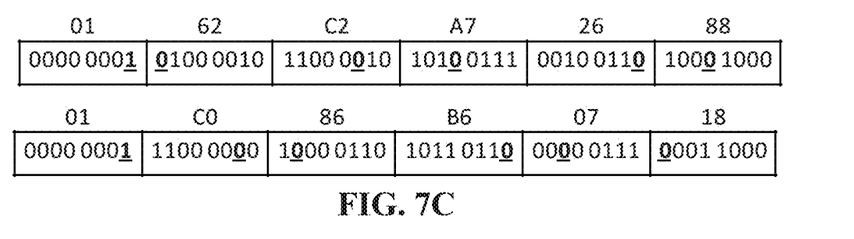
FIG. 7C is a schematic diagram of setting multicast bits and clear-obfuscation of bit addresses applied in the digital data transmission system with the identity-masking mechanism in accordance with a preferred embodiment of the present invention.

FIG. 7B shows a schematic diagram of setting multicast bits and set-obfuscation of bit addresses applied in the digital data transmission system with the identity-masking mechanism in accordance with a preferred embodiment of the present invention; and FIG. 7C shows a schematic diagram of setting multicast bits and set-obfuscation of bit addresses applied in the digital data transmission system with the identity-masking mechanism in accordance with a preferred embodiment of the present invention. Referring now to FIGS. 2, 7A, 7B and 7C, in address filtering operation, "Octet 0" is remained and rightmost multicast addresses are set "1". In the transmitter device 21, any bit of "Octet 1" to "Octet 5" is processed by set-obfuscation, as best shown in FIG. 7B, or by clear-obfuscation, as best shown in FIG. 7C.

Referring back to FIGS. 7B and 7C, in set-obfuscation operation, two of the destination identity-masking marks are 01-D2-CE-F7-A7-99 and 01-CA-D6-BF-2F-B8 which can be verified by address filtering with 1-filter of the receiver device 22. Similarly, in clear-obfuscation operation, two of the destination identity-masking marks are 01-62-C2-A7-26-88 and 01-C0-86-B6-07-18 which can be verified by address filtering with o-filter of the receiver device 22.

Figure 8A:
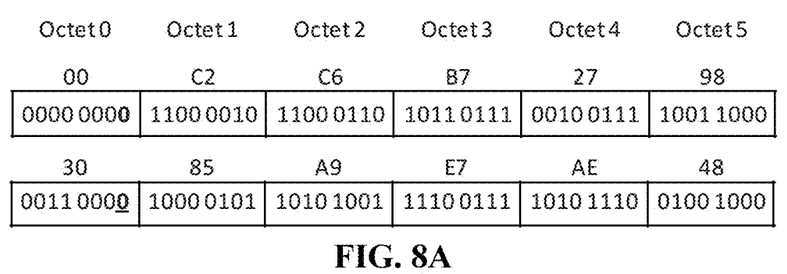
FIG. 8A is a schematic diagram of second original Ethernet network card addresses applied in the digital data transmission system with the identity-masking mechanism in accordance with another preferred embodiment of the present invention.

FIG. 8A shows a schematic diagram of two second original Ethernet network card addresses applied in the digital data transmission system with the identity-masking mechanism in accordance with another preferred embodiment of the present invention, corresponding to that shown in FIG. 7A. Referring now to FIGS. 2 and 8A, one of the transmitter devices 21 can multicast to two of the receiver devices 22. The two second original Ethernet network card addresses are 00-C2-C6-B7-27-98 and 30-85-A9-E7-AE-48 remained in the digital data transmission system.

Figure 8B:
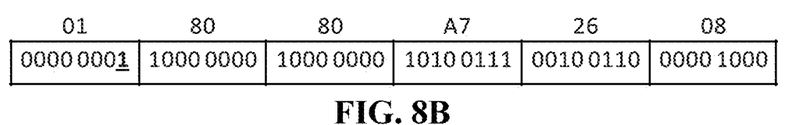
FIG. 8B is a schematic diagram of setting multicast bits and AND-fusion of bit addresses applied in the digital data transmission system with the identity-masking mechanism in accordance with another preferred embodiment of the present invention.
Figure 8C:
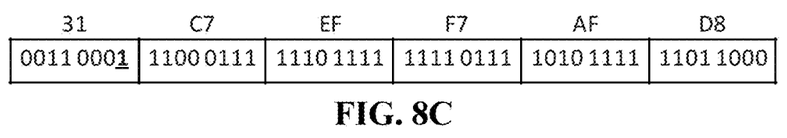
FIG. 8C is a schematic diagram of setting multicast bits and OR-fusion of bit addresses applied in the digital data transmission system with the identity-masking mechanism in accordance with another preferred embodiment of the present invention.

FIG. 8B shows a schematic diagram of setting multicast bits and AND-fusion of bit addresses applied in the digital data transmission system with the identity-masking mechanism in accordance with another preferred embodiment of the present invention; and FIG. 8C shows a schematic diagram of setting multicast bits and OR-fusion of bit addresses applied in the digital data transmission system with the identity-masking mechanism in accordance with another preferred embodiment of the present invention. Referring now to FIGS. 2, 8A, 8B and 8C, in address filtering operation, "Octet 0" is remained and rightmost multicast addresses are set "1". In AND-fusion operation of transmitter devices 21, the destination identity-masking mark is 01-80-80-A7-26-08 which can be verified by address filtering with 0-filter of the receiver device 22. Similarly, in OR-fusion operation, the destination identity-masking mark is 31-C7-EF-F7-AF-D8 which can be verified by address filtering with 1-filter of the receiver device 22.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A digital data transmission system comprising:
   a communication network system;
   at least one transmitter device operated to generate at least one originally unmasked digital data prior to data transmission therefrom;
   said at least one transmitter device connected with the communication network system and provided with at least one identity-masking mechanism to convert at least one identification data into at least one source identity-masking mark and at least one destination identity-masking mark which is combined with said at least one originally unmasked digital data in said at least one transmitter device to form or generate an originally source-marked data with said at least one source identity-masking mark and an originally destination-marked data with said at least one destination identity-masking mark, with the at least one transmitter device formed as an originally identity-masked transmitter device prior to data transmission from the at least one originally identity-masked transmitter device such that no unmasked data of transmitter devices is transmitted in said communication network system;
   the at least one originally identity-masked transmitter device provided with the identity-masking mechanism to transmit the originally source-marked data with said at least one source identity-masking mark and the originally destination-marked data with said at least one destination identity-masking mark in a data transmission operation via the communication network system; and
   at least one receiver device connected with the communication network system and provided with a self-identification data, with the at least one receiver device formed as at least one identity-masked receiver device prior to data transmission from the at least one transmitter device, with the at least one receiver device communicating with the at least one originally identity-masked transmitter device via the communication network system;
   wherein the at least one identity-masked receiver device is applied to verify the originally source-marked data with said at least one source identity-masking mark or the originally destination-marked data with said at least one destination identity-masking mark with the self-identification data, with refusing to access the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is not successfully verified with the self-identification data; or with receiving or accessing the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is successfully verified with the self-identification data; and wherein the source or destination identity-maskinq mark includes at least one source or destination address, at least one source or destination network card address, at least one source or destination Media Access Control (MAC) address, at least one source or destination Internet Protocol (IP) address or combinations thereof.

2. The digital data transmission system as defined in claim 1, wherein the identity-masking mechanism includes a pre-address screening mechanism or a pre-address transforming mechanism.

3. The digital data transmission system as defined in claim 1, wherein the identity-masking mechanism includes an address obfuscation mechanism or an address fusion mechanism.

4. The digital data transmission system as defined in claim 3, wherein the address obfuscation mechanism includes a set-obfuscation mechanism or a clear-obfuscation mechanism; or the address fusion mechanism includes an AND-fusion mechanism or an OR-fusion mechanism.

5. The digital data transmission system as defined in claim 1, wherein the at least one receiver device includes an address filtering mechanism.

6. The digital data transmission system as defined in claim 1, wherein the at least one originally identity-masked transmitter device further utilizes the at least one source identity-masking mark or the at least one destination identity-masking mark to combine with the originally source-marked data with said at least one source identity-masking mark or the originally destination-marked data with said at least one destination identity-masking mark to form or generate a multiple marked data which is further transmitted to at least one receiver device or at least one group of receiver devices which utilize the self-identification data to verify the multiple marked data.

7. A digital data transmission method comprising:
generating at least one originally unmasked digital data in at least one transmitter device prior to data transmission therefrom;
utilizing at least one identity-masking mechanism provided in said at least one transmitter device to convert at least one identification data into at least one source identity-masking mark and at least one destination identity-masking mark which is combined with said at least one originally unmasked digital data in said at least one transmitter device to form or generate an originally source-marked data with said at least one source identity-masking mark and an originally destination-marked data with said at least one destination identity-masking mark, with the at least one transmitter device formed as at least one originally identity-masked transmitter device prior to data transmission from the at least one originally identity-masked transmitter device such that no unmasked data of transmitter devices is transmitted in said communication network system;

operating the at least one originally identity-masked transmitter device to transmit the originally source-marked data with said at least one source identity-masking mark and the originally destination-marked data with said at least one destination identity-masking mark in a data transmission operation via a communication network system, with the at least one transmitter device provided with the at least one identity-masking mechanism;

operating at least one receiver device or at least one group of receiver devices with a self-identification data, with the at least one receiver device or the at least one group of receiver devices formed as at least one originally identity-masked receiver device or at least one group of originally identity-masked receiver devices prior to data transmission from the at least one transmitter device, with communicating the at least one originally identity-masked receiver device or the at least one group of originally identity-masked receiver devices with the at least one originally identity-masked transmitter device via the communication network system and verifying the originally source-marked data with said at least one source identity-masking mark or the originally destination-marked data with said at least one destination identity-masking mark with the self-identification data; and the at least one originally identity-masked receiver device or the at least one group of originally identity-masked receiver devices refusing to access the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is not successfully verified with the self-identification data; or the at least one originally identity-masked receiver device or the at least one group of originally identity-masked receiver devices receiving or accessing the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is successfully verified with the self-identification data; and wherein the source or destination identity-maskinq mark includes at least one source or destination address, at least one source or destination network card address, at least one source or destination Media Access Control (MAC) address, at least one source or destination Internet Protocol (IP) address or combinations thereof.

8. The digital data transmission method as defined in claim 7, wherein the identity-masking mechanism includes a pre-address screening mechanism or a pre-address transforming mechanism.

9. The digital data transmission method as defined in claim 7, wherein the identity-masking mechanism includes an address obfuscation mechanism or an address fusion mechanism.

10. The digital data transmission method as defined in claim 9, wherein the address obfuscation mechanism includes a set-obfuscation mechanism or a clear-obfuscation mechanism; or the address fusion mechanism includes an AND-fusion mechanism or an OR-fusion mechanism.

11. The digital data transmission method as defined in claim 7, wherein the at least one receiver device or the group of receiver devices includes an address filtering mechanism.

12. The digital data transmission method as defined in claim 7, wherein the at least one originally identity-masked transmitter device further utilizes the at least one source identity-masking mark or the at least one destination identity-masking mark to combine with the originally source-marked data with said at least one source identity-masking mark or the originally destination-marked data with said at least one destination identity-masking mark to form or generate a multiple marked data which is further transmitted to at least one receiver device or at least one group of receiver devices which utilize the self-identification data to verify the multiple marked data.

13. A digital data transmission system comprising:
a communication network system;
at least one transmitter device operated to generate at least one originally unmasked digital data prior to data transmission therefrom;
said at least one transmitter device connected with the communication network system and provided with at least one identity-masking mechanism to convert at least one identification data into at least one source identity-masking mark and at least one destination identity-masking mark which is combined with said at least one originally unmasked digital data in said at least one transmitter device to form or generate an originally source-marked data with said at least one source identity-masking mark and an originally destination-marked data with said at least one destination identity-masking mark, with the transmitter device formed as originally an identity-masked transmitter device prior to data transmission from the at least one originally identity-masked transmitter device such that no unmasked data of transmitter devices is transmitted in said communication network system;
the at least one originally identity-masked transmitter device provided with the identity-masking mechanism to transmit the originally source-marked data with said at least one source identity-masking mark and the originally destination-marked data with said at least one destination identity-masking mark in a data transmission operation via the communication network system; and
at least one smart card receiver/transmitter connected with the communication network system and provided with a self-identification data, with the at least one smart card receiver/transmitter formed as at least one identity-masked smart card receiver/transmitter prior to data transmission from the at least one originally identity-masked transmitter device, with the at least one originally identity-masked smart card receiver/transmitter communicating with the at least one originally identity-masked transmitter device via the communication network system;
wherein the at least one identity-masked smart card receiver/transmitter is applied to verify the originally source-marked data with said at least one source identity-masking mark or the originally destination-marked data with the self-identification data with said at least one destination identity-masking mark, with refusing to access the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is not successfully verified with the self-identification data; or with receiving or accessing the originally source-marked data with said at least one source identity-masking mark or the originally destination-marked data with said at least one destination identity-masking mark if the originally source-marked data with said at least one source identity-masking mark or the originally destination-marked data with said at least one destination identity-masking mark is successfully verified with the self-identification data; and
wherein the source or destination identity-maskinq mark includes at least one source or destination address, at least one source or destination network card address, at least one source or destination Media Access Control (MAC) address, at least one source or destination Internet Protocol (IP) address or combinations thereof.

14. The digital data transmission system as defined in claim 13, wherein the identity-masking mechanism includes an address obfuscation mechanism or an address fusion mechanism.

15. The digital data transmission system as defined in claim 14, wherein the address obfuscation mechanism includes a set-obfuscation mechanism or a clear-obfuscation mechanism; or the address fusion mechanism includes an AND-fusion mechanism or an OR-fusion mechanism.

16. The digital data transmission system as defined in claim 13, wherein the at least one smart card receiver/transmitter includes an address filtering mechanism.

17. The digital data transmission system as defined in claim 13, wherein the at least one originally identity-masked transmitter device further utilizes the at least one source identity-masking mark or the at least one destination identity-masking mark to combine with the originally source-marked data with said at least one source identity-masking mark or the at least one destination-marked data with said at least one destination identity-masking mark to form or generate a multiple marked data which is further transmitted to at least one receiver device or at least one group of receiver devices which utilize the self-identification data to verify the multiple marked data.

* * * * *